United States Patent [19]
Hill et al.

[11] Patent Number: 5,432,847
[45] Date of Patent: Jul. 11, 1995

[54] LOW FREQUENCY TELECOMMUNICATION DIGITAL NETWORK INTERFACE PATCH PANEL

[75] Inventors: Timothy L. Hill, Spokane, Wash.; Paul D. Johnson, Post Falls, Id.; Donald R. Skinfill; Douglas E. Prussack, both of Veradale, Wash.

[73] Assignee: Telect, Inc., Liberty Lake, Wash.

[21] Appl. No.: 219,766

[22] Filed: Mar. 29, 1994

[51] Int. Cl.$^6$ .............................................. H04M 3/00
[52] U.S. Cl. ................................... 379/328; 379/327; 439/668; 439/188
[58] Field of Search ............... 379/326, 327, 328, 329, 379/332, 19, 21, 9; 439/188, 351, 357, 62, 65

[56] References Cited

U.S. PATENT DOCUMENTS

| | | | |
|---|---|---|---|
| 4,117,273 | 9/1978 | Gautier | 379/327 |
| 4,364,625 | 12/1982 | Baker | 439/188 |
| 4,367,907 | 1/1983 | Buck | 439/188 |
| 4,420,209 | 12/1983 | Reis | 439/357 |
| 4,649,236 | 3/1987 | DeLuca | 379/327 |
| 4,737,985 | 4/1988 | DeLuca | 379/326 |
| 4,752,107 | 6/1988 | Gunell | 379/326 |
| 4,975,072 | 12/1990 | Afshar | 379/327 |
| 4,975,087 | 12/1990 | Williams et al. | 439/668 |
| 5,030,123 | 7/1991 | Silver | 439/188 |
| 5,145,380 | 9/1992 | Holcomb | 439/49 |
| 5,145,416 | 9/1992 | Cruise | 439/188 |
| 5,266,042 | 11/1993 | Hampel | 439/188 |

OTHER PUBLICATIONS

"ADC Digital Distribution Panel," ADCP 80-500, p. 1-1 thru p. 2-30, ADC Telecommunications, Inc., 1991.
Augat Telzon "DS-1 Cross-Connect/Test Access Panel (DSX TAP)" Technical Practice 49211, pp. 1-4, Augat Communications Group, Inc., 1991.

Primary Examiner—James L. Dwyer
Assistant Examiner—Thomas Presson
Attorney, Agent, or Firm—Wells, St. John, Roberts, Gregory & Matkin

[57] ABSTRACT

A low frequency telecommunication digital network interface patch panel 10 is described having the capability of terminating and providing front access to one-hundred-sixty-eight low frequency network elements 12 and 14 that generate low frequency signals between 1 and 3 Mbps. The panel has a housing with twenty-one adjacent modules; each module being one inch in width and having an upper set of wire-wrap pins 38 and a lower set of wire-wrap pins 40 that are spaced at one-quarter inch on center from each other. The pins 38, 40 are arranged in upper columns and lower columns that are vertically aligned with each other. The pins 38, 40 extend forward from a printed circuit board 60 through front module members 62 to ends 54 and rearward through rear module member 64 to wire-wrap terminal ends 56. The ends 56 are adapted for permanent termination with twisted wire pairs of the network elements. The forward front ends 64 are adapted to receive a female access plug 120 having four wire-wrap pin cavities 126. The printed circuit board 60 has a switch means 78 for operatively interconnecting a column 40 with a corresponding lower set of four pins 44. The female patch plug 120 includes a projecting switch actuating member 134 that serves to interrupt the normally closed condition of the switch means 78 when the female patch plug 120 is inserted over a selected column of pins 40, 44.

55 Claims, 9 Drawing Sheets

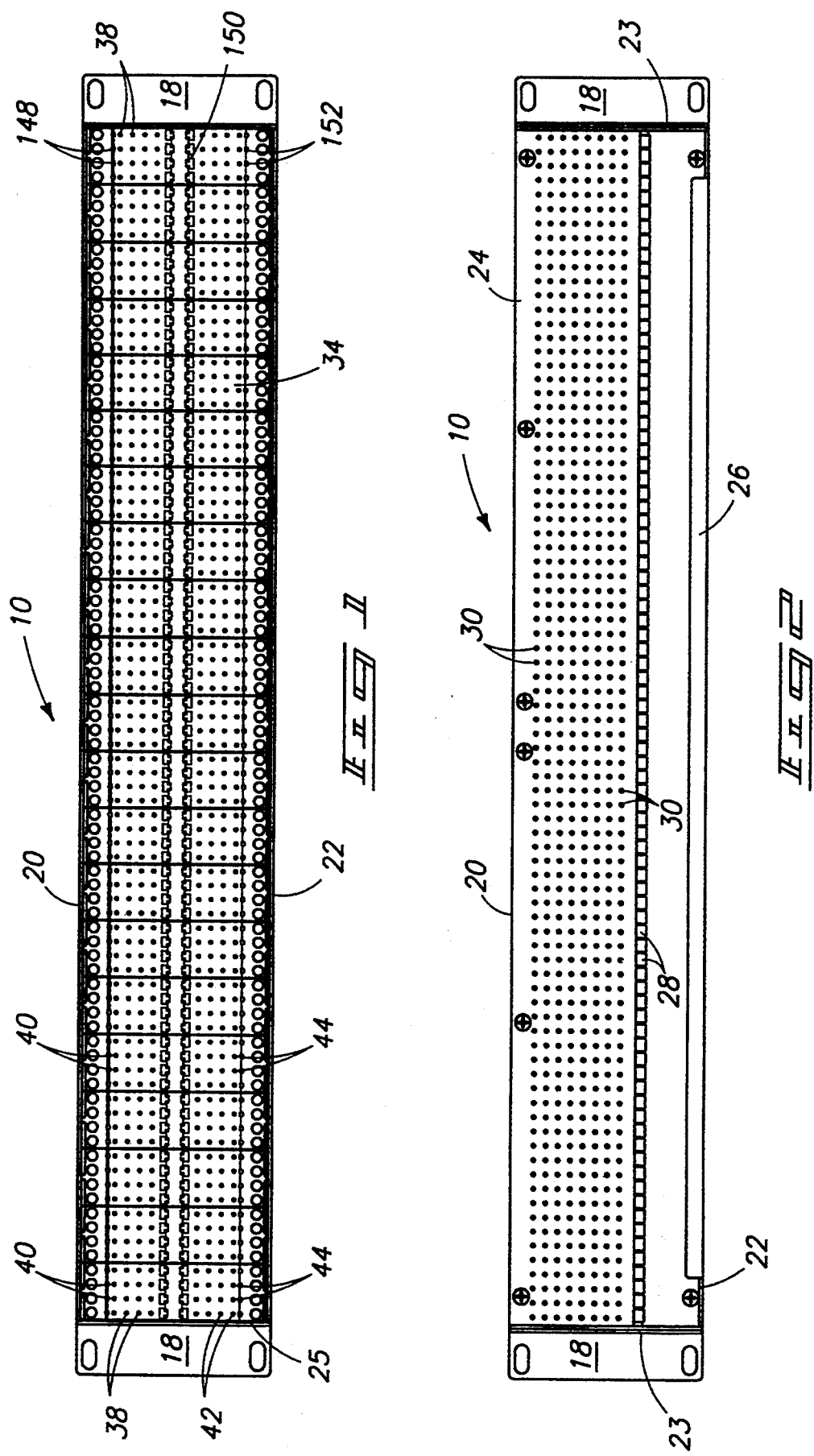

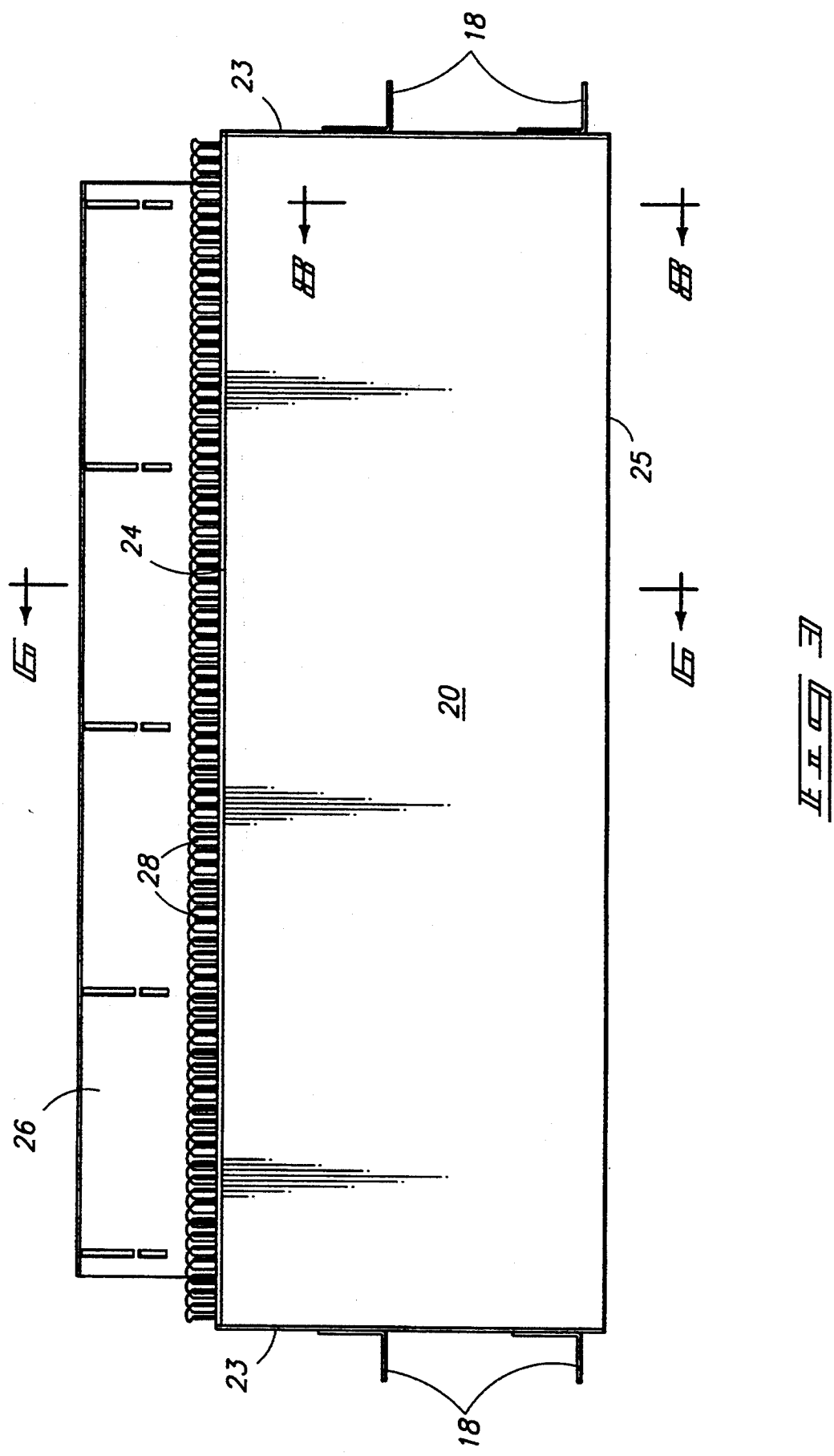

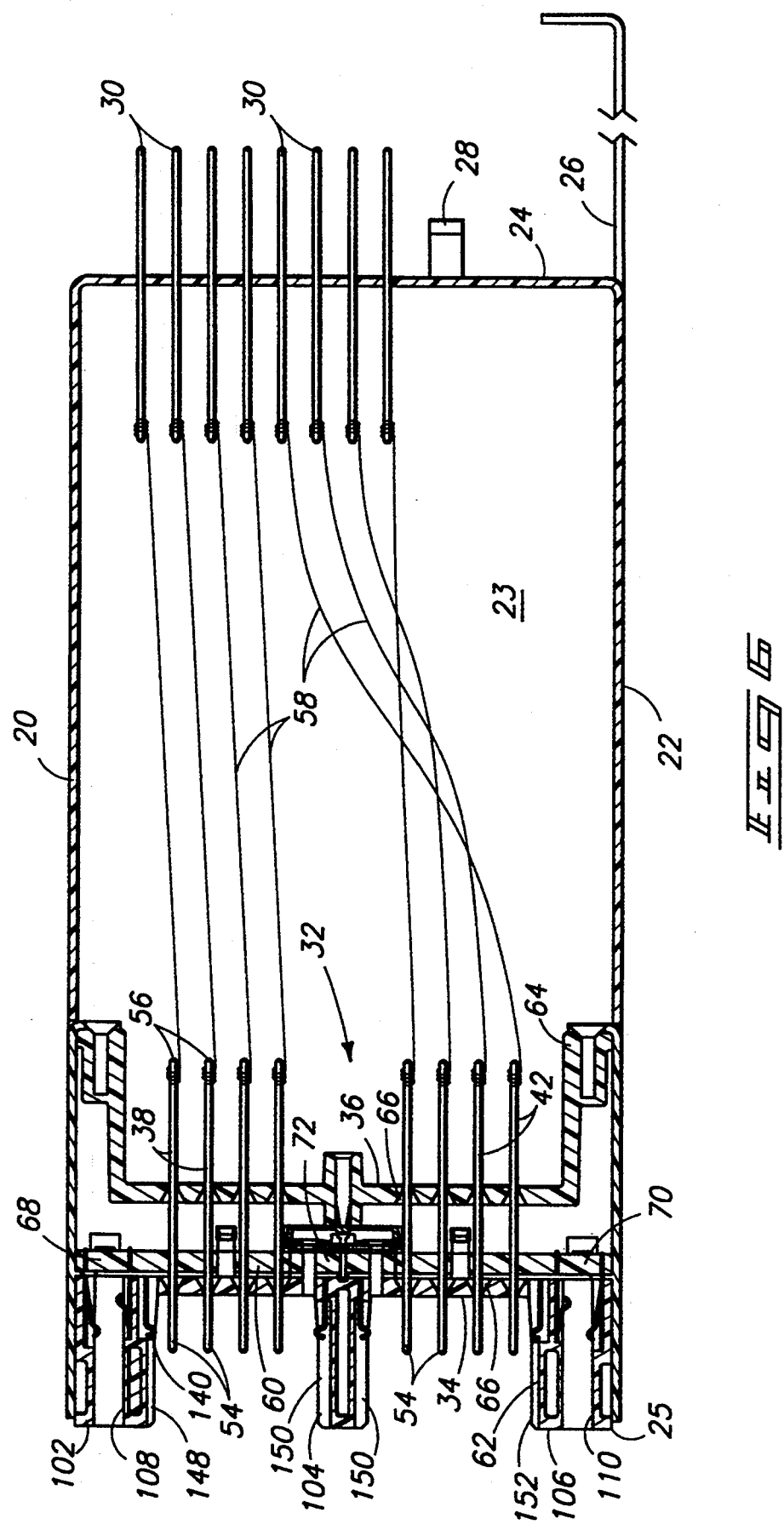

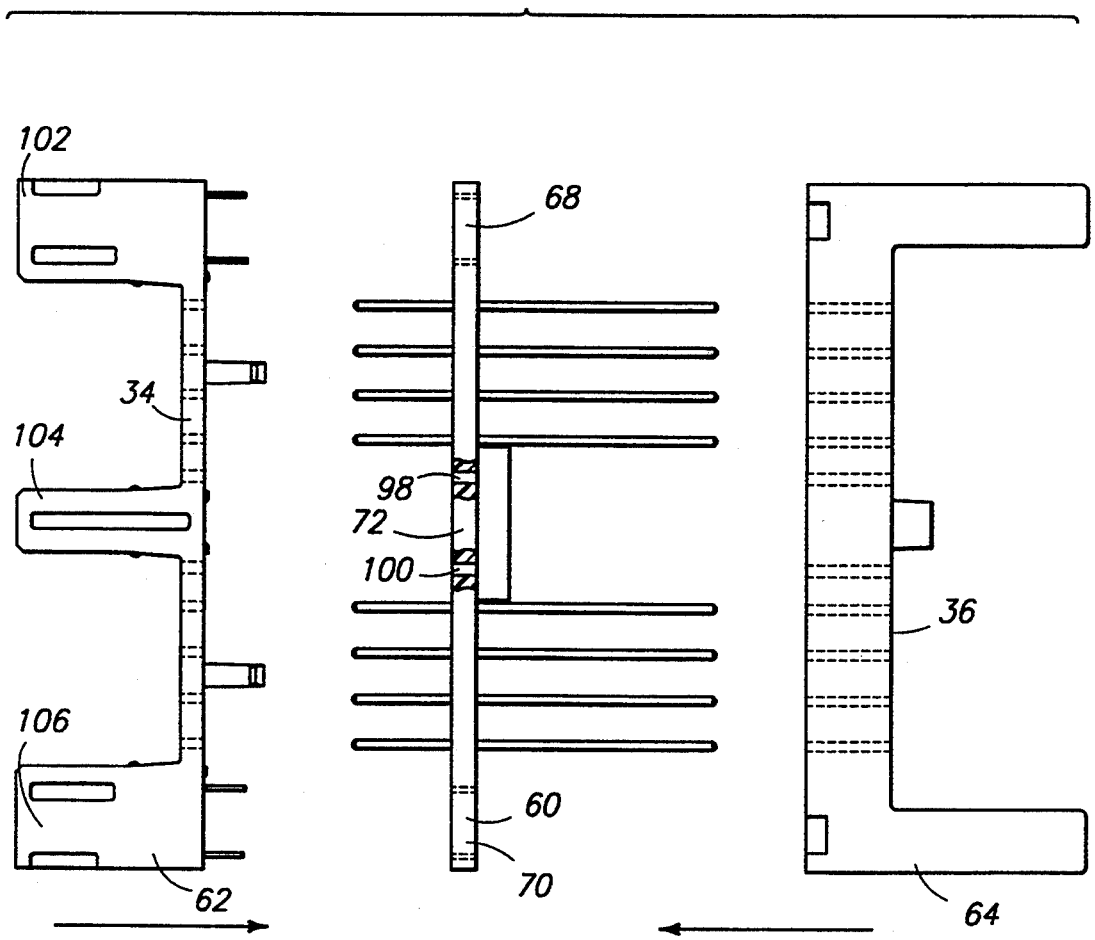

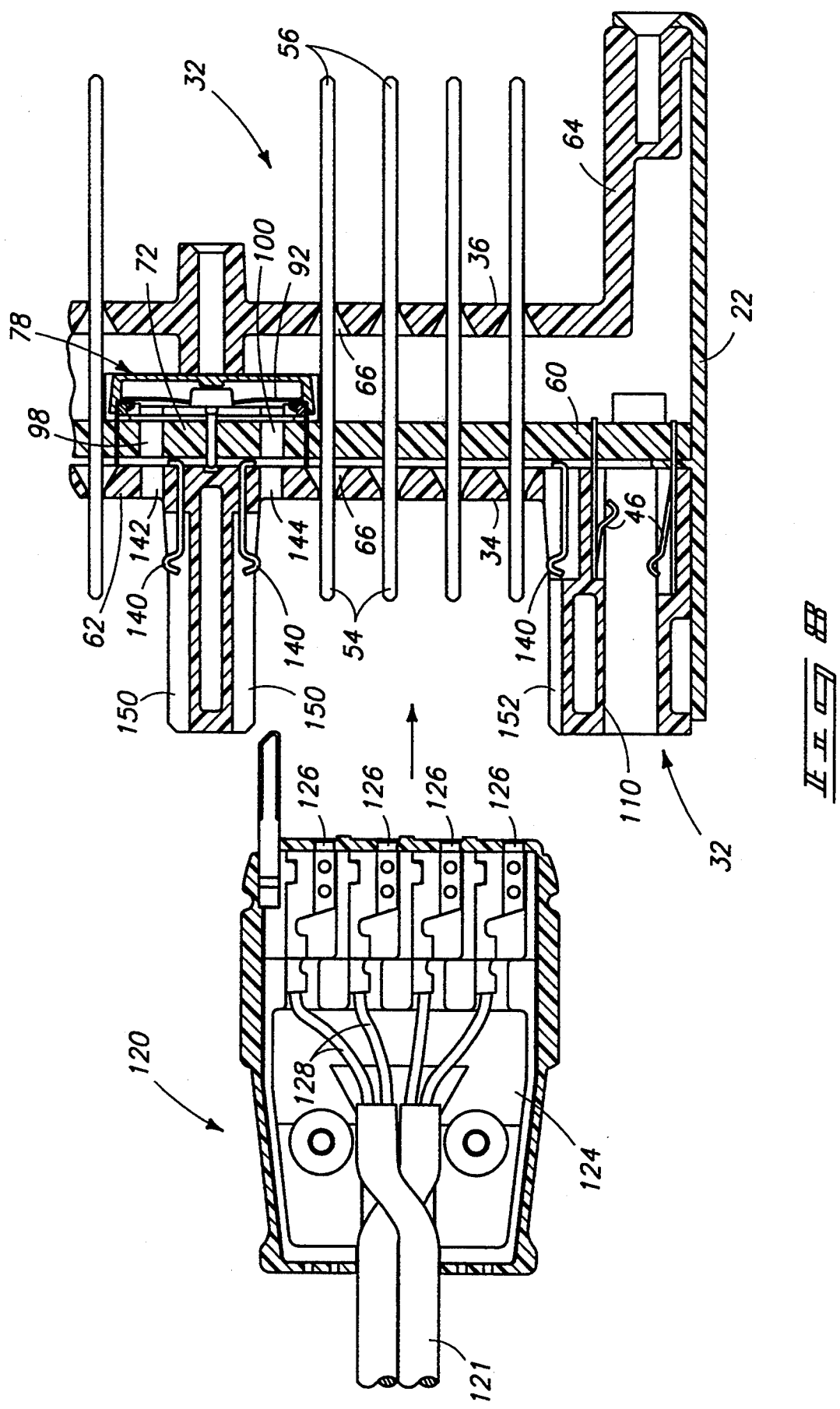

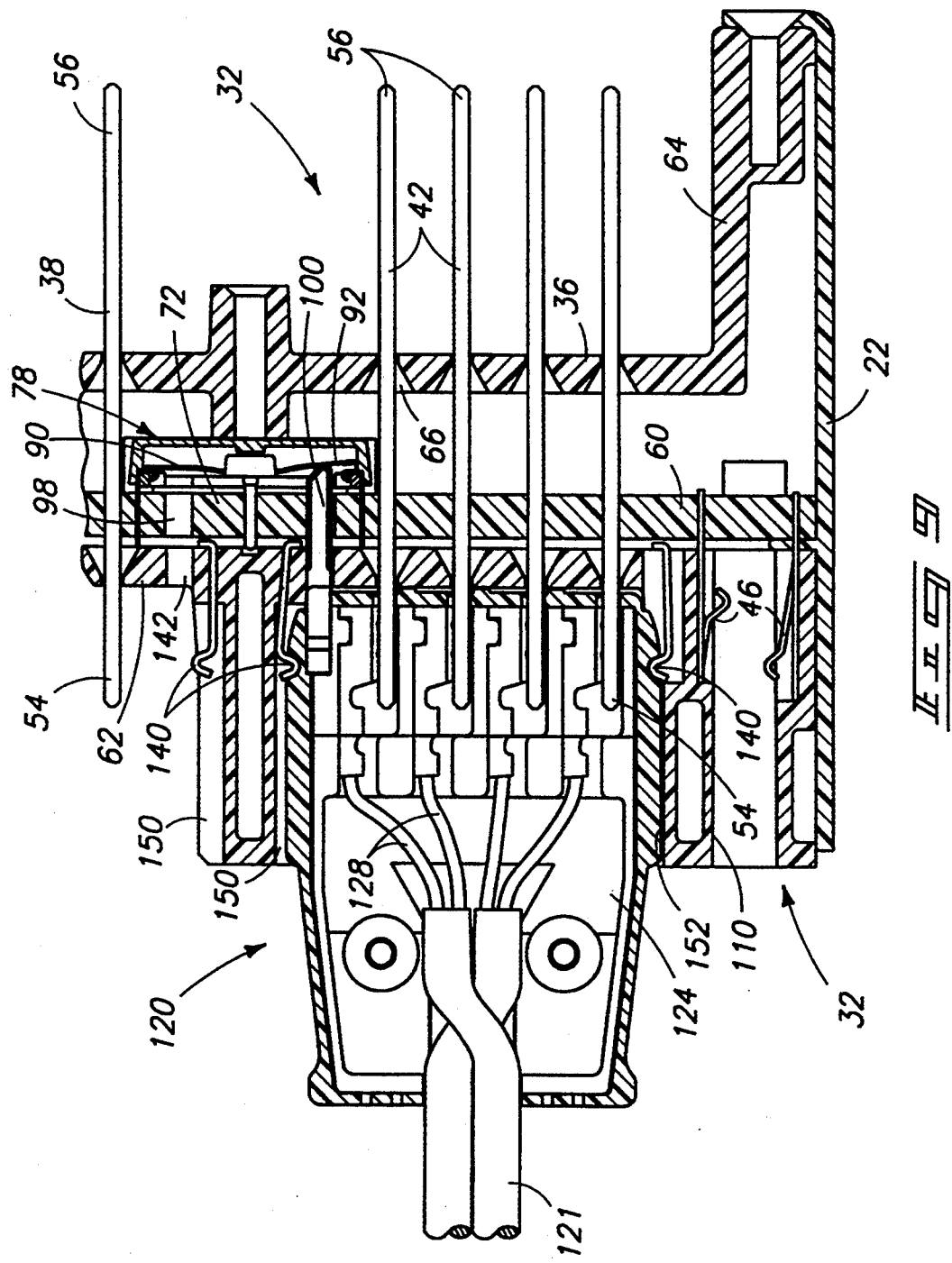

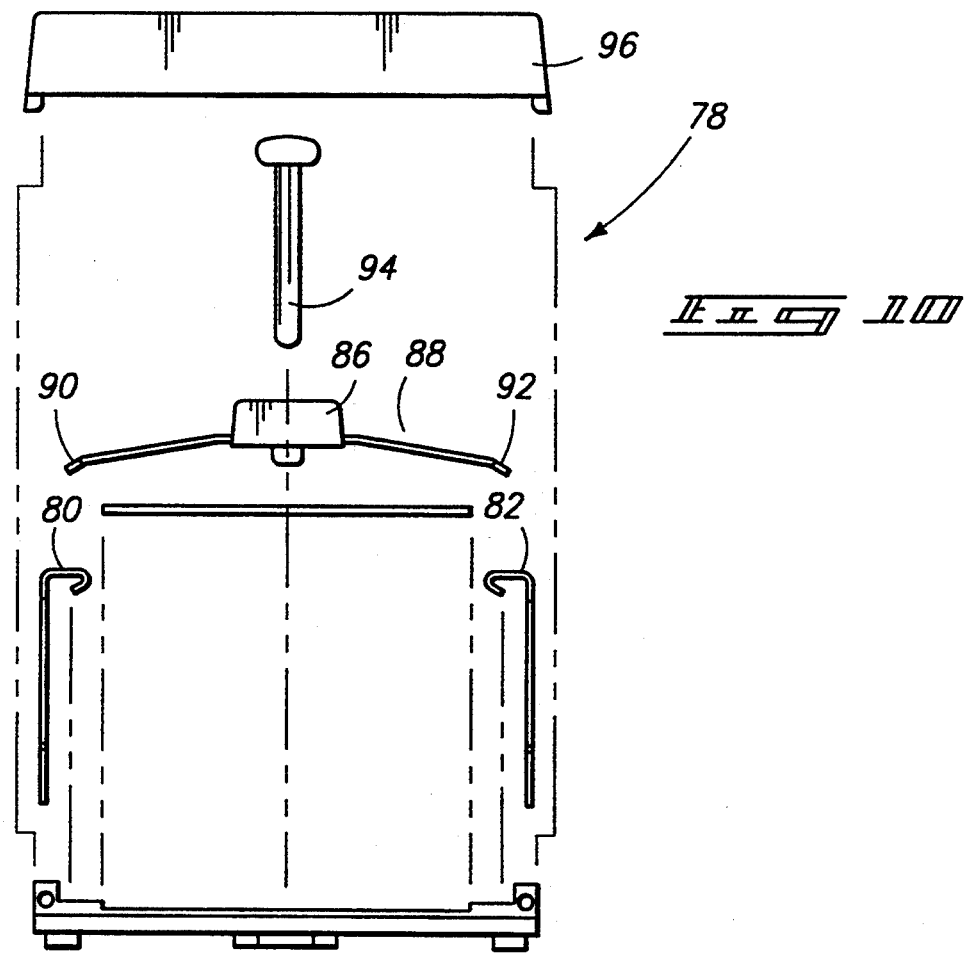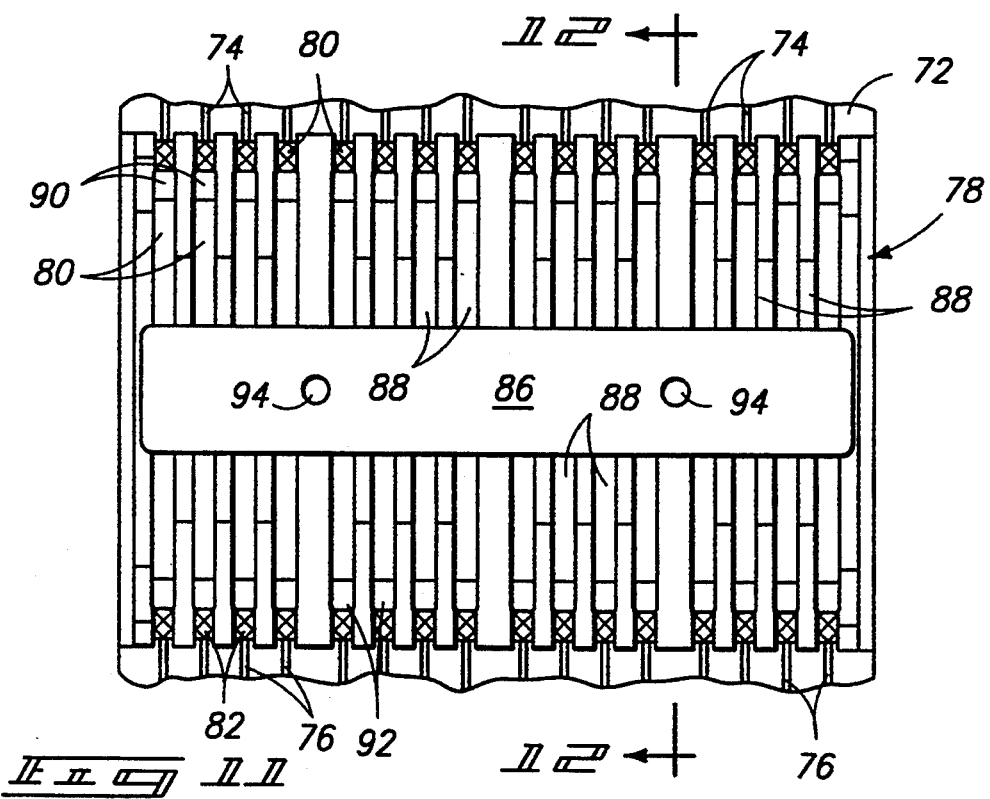

LOW FREQUENCY TELECOMMUNICATION DIGITAL NETWORK INTERFACE PATCH PANEL

TECHNICAL FIELD

This invention relates to low frequency (DS-1, DS-1C, and DS-2) telecommunication digital network interface patch panels to facilitate terminating, monitoring, testing and patching of low frequency telecommunication network circuits.

BACKGROUND OF THE INVENTION

One of principal problems facing telephone companies, is the difficulty of increasing the number of telecommunication network circuits without increasing the size of the terminating and switch facilities. Economy of space is very important.

Additionally, maintaining versatility and the ability to patch and repair circuits is also important. With more and more switching being done electronically, the consequences of equipment failure becomes more serious. If a single electronic switching equipment fails, thousands of telecommunication circuits may be interrupted and adversely affected. Consequently there is a need to provide patch and rerouting access to the network circuits while at the same time reducing the panel space and costs required to provide such service.

At the present time, ADC Telecommunications Inc. of Minneapolis, Minn. provides a digital interface patch panel called "Digital Distribution Point" or "DDP" capable of terminating and providing patch access to 128 circuits on a standard 23 inch rack shelf within a vertical space of 6 inches of vertical space on the rack shelf. To obtain patch access to a circuit, the DDP panel utilizes a special connector block that initializes a special "access jack card". Such an access patch panel, with the special "access jack card", is still rather expensive, even though it may be less expensive than a typical digital cross-connect jack panel.

One of the principal objects and advantages of this invention is to provide a unique low frequency telecommunication digital network interface patch panel that increases the number (density) of network circuits that may be terminated and patch accessed within a limited space that is less costly than previous digital interface patch panels.

An additional object and advantage of this invention is to provide a unique low frequency telecommunication digital network interface patch panel having the ability to handle up to 168 circuits on a standard 23 inch rack shelf within a vertical panel space of 3½ inches.

A further object and advantage of this invention is to provide a unique low frequency telecommunication digital network interface patch panel that is less expensive providing a low cost alternative to conventional digital cross-connect jack panels.

These and other objects and advantages of this invention will become apparent upon reading and understanding the following detailed description of a preferred embodiment.

BRIEF DESCRIPTION OF THE DRAWINGS

Preferred embodiments of the invention are described below with reference to the accompanying drawings, which are briefly described below.

FIG. 1 is front elevational view of a preferred embodiment of a low frequency telecommunication network interface patch panel;

FIG. 2 is a rear elevational view of the interface patch panel illustrated in FIG. 1;

FIG. 3 is a plan view of the interface patch panel illustrated in FIG. 1;

FIG. 6 is a vertical cross sectional view taken along line 6—6 in FIG. 3, illustrating the interior of the panel;

FIG. 7 s an enlarged exploded view of several of the components of the interface patch panel;

FIG. 8 is a vertical cross section view taken along 8—8 in FIG. 3 of a portion of the panel illustrating a patch cord plug about to be inserted into a front of the panel;

FIG. 9 is a vertical cross section view similar to FIG. 8 except illustrating the full insertion of the patch cord plug into the front of the panel to gain electrical access to telecommunication network circuits;

FIG. 10 is an exploded side view of a panel printed circuit board switch sub-assembly;

FIG. 11 is an isolated plan view of the switch assembly illustrated in FIG. 10 except showing the switch assembly in an assembled condition;

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 5:
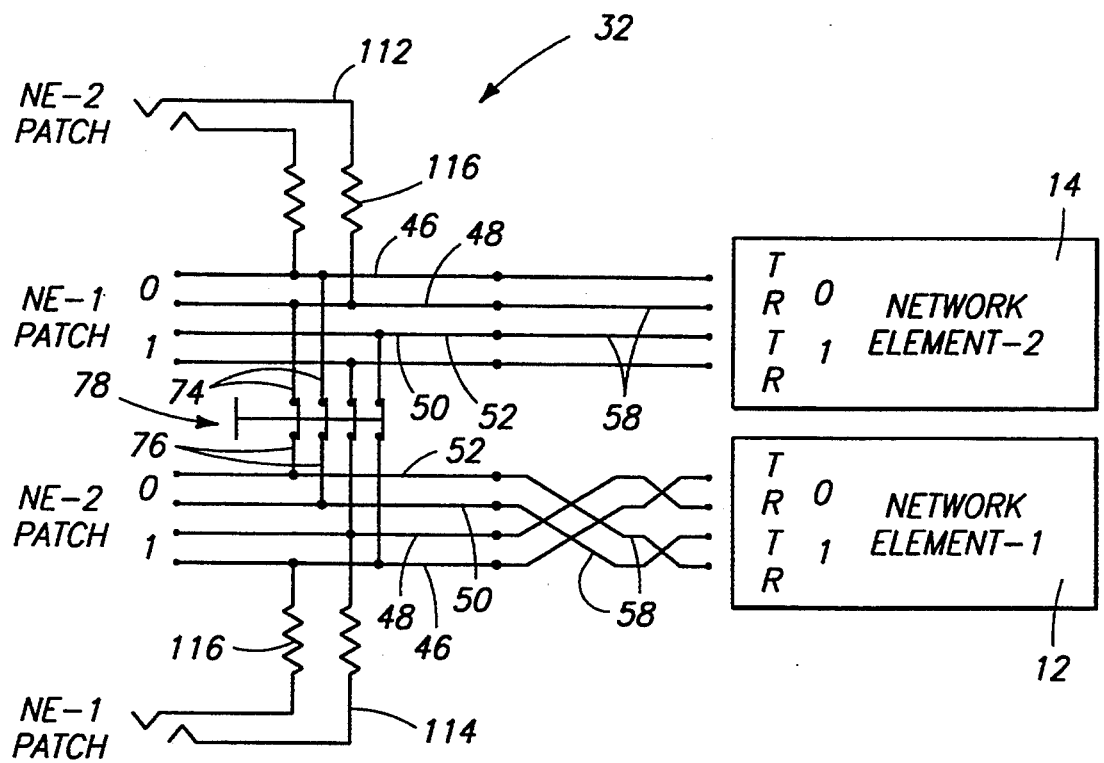
FIG. 5 is an electrical schematic of electrical circuits incorporated in the interface patch panel illustrated in FIG. 1.
Figure 12:
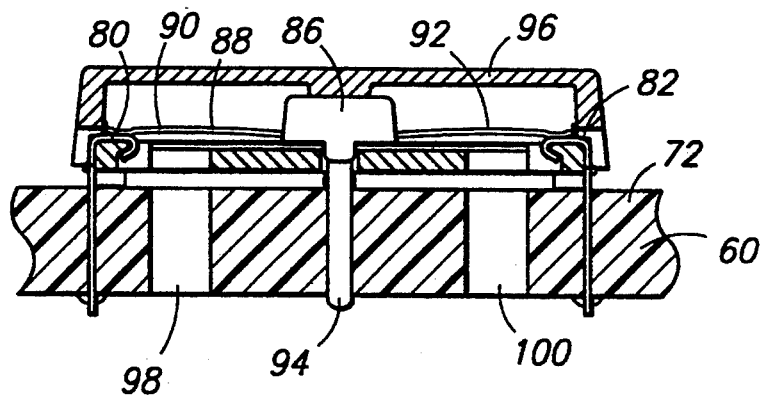
FIG. 12 is cross-sectional view taken along line 12—12 in FIG. 11.

Referring to the drawings, there is illustrated in FIGS. 1, 2 and 3 a preferred low frequency telecommunication digital network interface patch panel, generally designated with the numeral 10. The panel 10 provides a high density termination and access panel that can be manufactured at a less expensive cost compared to traditional cross connect jack panels. Patch panel 10 is designed to handle low frequency digital signals between 1 Mbps and 3 Mbps (DS-1, DS-1C, and DS-2). The patch panel 10 is designed to provide termination and front access of up to 168 network elements 12 and 14 (FIG. 5). Each of the network elements 12 and 14 has twisted wire pairs, with each network element having a tip signal output wire, a ring signal output wire, a tip signal input wire and a ring signal input wire.

Figure 4:
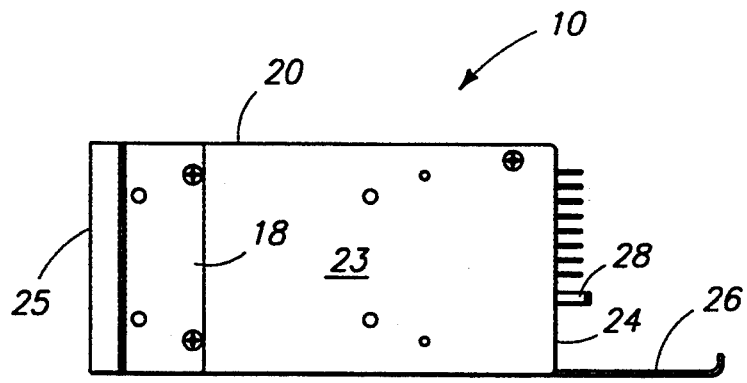
FIG. 4 is a right side view of the interface patch panel illustrated in FIG. 1.

The patch panel 10 includes an elongated housing that is generally mounted in a horizontal orientation between panel rack side supports utilizing mounting brackets 18. Frequently each panel 10 is mounted on a 23 inch rack shelf within a vertical space of 3½ inches. The housing 16 includes a top wall 20, a bottom wall 22, side walls 23, a rear or termination wall 24 and front opening 25. Generally the rear wall 24 is frequently referred to as "the back plane" for termination purposes. The back or rear wall 24 includes a wire tray 26 that extends rearward for supporting the twisted pair wires from the network elements. Twisted pair wire guides 28 are provided above the wire tray 26 as illustrated in FIG. 3 and 4, to separate terminated individual twisted wire pairs.

The rear wall includes a plurality of back plane termination wrap wire pins 30 to wire wrap connect to the twisted wire pairs from the network elements 12 and 14.

In the embodiment illustrated, the rear wall 24 of each panel has 672 termination pins that are arranged in an array of 84 vertical columns of eight rows with the pins spaced on vertical and horizontal one-quarter inch center-to-center spacing to facilitate the termination of 168 network elements.

The patch panel 10 includes one or more front access modules 32 mounted in the front opening 25 of the housing 20. Each module 32 has a front access face 34 and a rear terminal face 36. In the preferred embodiment illustrated, the patch panel 10 includes 21 side-by-side modules mounted in the open front 25 that are each one inch in width for servicing eight network elements 12, 14.

Each module 32 (FIG. 6) includes an upper set of wire-wrap pins 38 having one end 54 that extends outward from the front access face 34 and an opposite end 56 extending outward from the rear termination face 36. The upper set of wire-wrap pins 38 are arranged in a set of adjacent upper columns 40 of four pins each in which each of the pins 38 are positioned at one-quarter inch on center both in the vertical and horizontal direction. Each column 40 of four pins is associated with a particular network element 12.

Additionally, each module 32 includes a lower set of wire-wrap pins 42 that are arranged in adjacent lower columns 44 of four pins each in which each column of four pins is associated with a network element 14. Preferably each of the lower set of wire-wrap pins 42 are positioned one-quarter inch on center in both the horizontal and vertical directions.

In the preferred embodiment, each upper column 40 of four pins 38 is vertically aligned with a lower column 44 of four pins 42. Each column 40 and 42 of four pins electrically (FIG. 5) defines a tip signal output pin 46, a ring signal output pin 48, a tip signal input pin 50 and a ring signal input pin 52.

Each pin 38, 42 extends outward with one or front end 54 extending outward from the front face 34 and a terminal or rear end 56 extending outward from the rear terminal face 36. In the preferred embodiment, each of the pins 38 and 42 are comprised of square wire-wrap pins having dimensions of 0.045 inches on each side.

The patch panel 10 includes wire-wrap wires 58 that are connected to the terminal ends 56 of each of the wire-wrap pins 38 and 42 and extend rearward connecting to respective back plane termination pins 30, as illustrated in FIG. 6. In some embodiments, it may be desirable to remove the back plane termination pins 30 and instead utilize directly the termination or rear ends 56 of the wire-wrap pins 38 and 42.

Each module 32 has a printed circuit board 60 (FIGS. 7-9) that is sandwiched between a front module member 62 and a rear module member 64. Each of the front module members 62 and rear module members 64 have a complementary number of apertures 66 formed therein to permit the patch access ends 54 of the wire-wrap pins 38 and 42 to extend through the front module member 62 and to enable the termination ends 56 to extend through the rear module member 64, as illustrated in FIGS. 6-8.

The printed circuit board 60 includes an upper section 68 for receiving and supporting the upper set of wire-wrap pins 38 and a lower section 70 for receiving and supporting the lower set of wire-wrap pins 42. The printed circuit board has a central section 72 between the upper section 68 and the lower section 70.

Electrical circuits (FIG. 5) in the form of printed circuit board upper traces 74 (FIG. 11) are formed on the upper section 68 of the printed circuit board 60 and lower traces or conductors 76 are formed on the lower section 70.

The panel 10 includes a switching means generally designated with the numeral 78 that is positioned at the central section 72 for interconnecting the upper and lower traces to normally interconnect the four wire network elements 12 and the four wire network elements 14. The switching means 78 includes upper stationary contacts 80 communicating with the upper traces 74 and lower stationary contacts 82 communicating with the lower traces or conductors 76, that are mounted on the printed circuit board 60.

The switch means 78 includes a movable contact set sub-assembly with a central support 86. The central support 86 has four sets of four leaf springs 88 that extend from respective upper stationary contacts 80 to lower stationary contacts 82 providing electrical communication between respective pins 46, 48, 50 and 52 of the upper column with corresponding pins 50, 52, 46 and 48 of the lower column 44. The central support 86 specifically includes four sets of four conductive leaf springs having upwardly spring contacts 90 that extend upward from the central support 86 to the upper stationary contacts 80 on the printed circuit board 60. Lower spring contacts 92 extend from the central support 86 downward to the lower stationary contacts 82. The switch means 78 includes a central support fastener 94 (FIG. 10) for mounting the central support and the leaf spring 66 on the central section 72 of the printed circuit board 60. The spring means 78 includes a switch housing 96 that overlays the switch assembly to minimize contact contamination.

The central section 72 of the printed circuit board 60 has an upper switch actuation access apertures 98 that are formed on the printed circuit board in alignment with each set of four upper spring contacts 90 and lower switch actuation access apertures 100 formed in the central section 72 in alignment with each set of four lower spring contacts 92.

As illustrated in FIGS. 6 and 7, the front module member 62 includes an upper projection 102 that extends forward from the front face 34 above the forward ends 54 of the upper set of wire-wrap pins 38. The front module member 62 further includes a central projection 104 that extends outward from the front face between the upper and lower columns of pins 38 and 42. Likewise, the front module member 62 has a lower projection 106 that extends outward along side the lower set of wire-wrap pins 42.

Both the upper projection 102 and the lower projection 106 contain four bantam jacks 108 and 110 respectively for receiving bantam jack plugs to facilitate monitoring of the electrical circuits of the network elements without interfering with the signals. Electrical circuits 112 and 114 are operatively connected between the bantam jacks 108 and 110, as illustrated in electrical schematic (FIG. 5), through the printed circuit board 60. Each of the electrical circuits 112 and 114 include isolation resistors 116 (FIG. 5) that are mounted on the printed circuit board (not shown) for enabling a maintenance person, with the use of a bantam plug, to monitor the signals from the network elements 12 and 14 without interfering with their signals.

Figure 13:
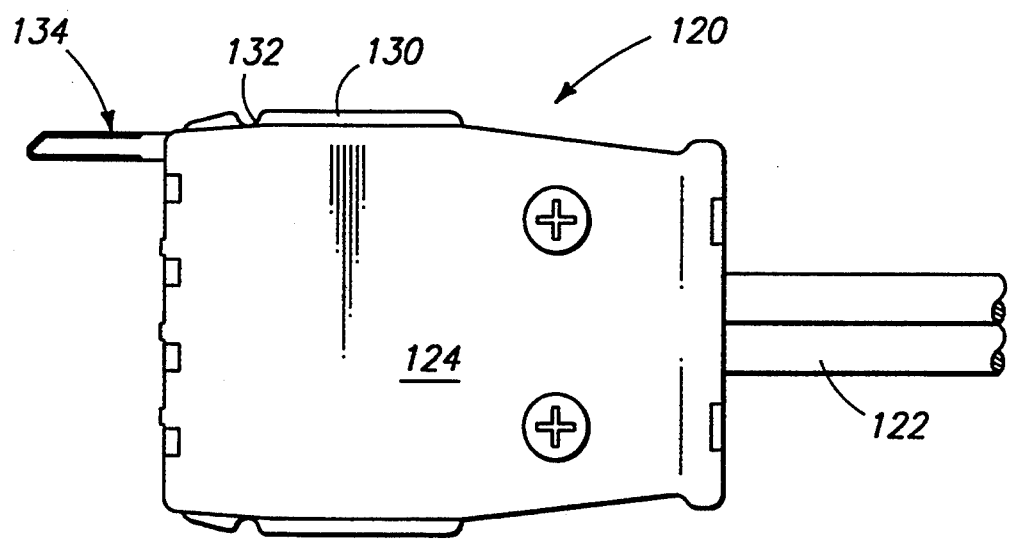
FIG. 13 is an isolated side view of the patch cord plug illustrated in FIG. 8.
Figure 14:
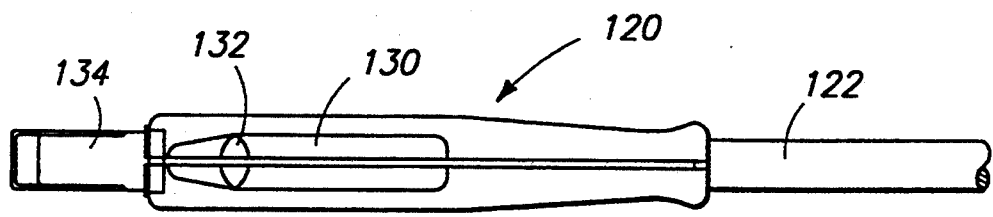
FIG. 14 is an isolated plan view of the patch cord plug illustrated in FIG. 13.

The patch panel 10 is design to accommodate a female patch plug 120 that is illustrated in FIGS. 8 and 9 and 13–15. The female patch plug 120 is at the end of a four wire cable 122 to provide front access by mounting over a selected column 40 or 44 of four wire-wrap pins. The plug 120 has a body 124 that has a rather wide width as illustrated in FIG. 13 and a rather narrow thickness as illustrated in FIG. 14. The female patch plug 120 includes four female pin cavities 126 adapted to receive four selected wire-wrap pins as the plug 120 is inserted onto the front face 34 of the panel 10. The plug 120 includes four electrical circuits 128 (FIGS. 8 & 9) for providing electrical contact with the wire-wrap pins that are received in the cavities 126.

As illustrated in FIGS. 13 & 14, the plug has rather narrow edges 130 with indentations 132. The indentations 132 provides part of a latching means to releasable latch the plug 120 to the front of the panel 10.

Additionally, the female patch plug 120 includes a switch actuation member 134 in the form of a rather wide projection that extends outward adjacent one edge in front of the plug 120. The front actuation member 134 projects through respective upper and lower guide apertures 142 and 144 formed in the front module body 62 in alignment with the respective upper and lower access apertures 98 and 100 of the printed circuit board 60.

The upper projection 102, central projection 104 and lower projection 106 each contain guide slots 148, 150 and 152 respectively for receiving the edge of the female latch plug 120 particularly the narrow edges 130 for guiding the female latch plug 120 onto a selected column 40, 44 of wire-wrap pins.

The panel 10 includes a releasable latching means that includes a spring detent 140 formed in the slots 148, 150 and 152 for receiving the narrow edge 130 of the plug and for projection into the indentation 132 to releasably secure the latch plug 120 to the front of the panel 10.

It should be particularly noted, that switch actuation member 134 in conjunction with the switching means 78 provides for a make-before-break switching arrangement. When the female latch plug 120 is initially inserted onto the patch access ends 54 of the pins 46, 48, 50 and 52, the access plug receives signals that are transmitted between the network elements 12 and 14. Further insertion of the plug causes the switch actuation member 134 to move through the upper or lower guide projections 142 or 144 and respective printed circuit board apertures 98 or 100 to engage and displace the respective set of upper or lower spring contacts 90 and 92 to interrupt communication between the network element 12 and the network element 14. After the break of the switch, the access plug 120 is in direct communication with the selected network element 12 or 14. As the plug is removed, the communication between the network element 12 and 14 is reestablished before the plug contact is discontinued.

In addition, each of the bantam jacks 108 and 110 include electrical contacts 146 (FIGS. 8 & 9) that are electrically connected as illustrated in schematic form in FIG. 5. When a bantam plug is inserted into a respective bantam jack, the maintenance person is able to maintain the signals from the respective network elements 12, 14.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A high density, low frequency telecommunication digital network interface patch panel for terminating a plurality of four-wire low frequency telecommunication network elements and for enabling direct front electrical patch access to signals from such network elements, in which each of the four-wire telecommunication network elements includes a tip signal output wire, a ring signal output wire, a tip signal input wire, and a ring signal input wire, comprising:

a panel housing for normally mounting horizontally between uprights of a panel support;

one or more pin modules mounted in the panel housing, each module having a module body with a front access face and a rear termination face;

said module having an upper set of elongated wire-wrap pins extending through the module body with one end of each wire-wrap pin extending outward from the front access face and an opposite end extending outward from the rear termination face;

said upper set of wire-wrap pins being arranged in adjacent columns of four wire-wrap pins each, with each column of four wire-wrap pins being associated with a first four-wire network element;

said module having a lower set of elongated wire-wrap pins extending through the module body below the upper set, with one end of each lower set of wire-wrap pins extending outward from the front access face and an opposite end of each lower set of wire-wrap pins extending outward from the rear face;

said lower set of wire-wrap pins being arranged in adjacent lower columns of four wire-wrap pins each, with each lower column of four wire-wrap pins being associated (1) with a corresponding upper column of four wire-wrap pins, and (2) with a second four-wire telecommunication network element;

wherein one of the four wire-wrap pins in each pin column defines a tip signal output pin, with its opposite end adapted to interconnect with the tip signal output wire of one of the network elements;

wherein a second of the four wire-wrap pins in each pin column defines a ring signal output pin, with its opposite end adapted to interconnect with the ring signal output wire of one of the network elements;

wherein a third of the four wire-wrap pins in each pin column defines a tip signal input pin, with its opposite end adapted to interconnect with the tip signal input wire of one of the network elements;

wherein a fourth of the four wire-wrap pins in each pin column defines a ring signal input pin, with its opposite end adapted to interconnect with the tip signal input wire of one of the network elements;

a first electrical circuit for electrically interconnecting the first pin of an upper column with a third pin of a corresponding lower column to operatively electrically interconnect the tip output wire of the first network element and the tip input wire of the second network element;

a second electrical circuit for electrically interconnecting the second pin of an upper column with a fourth pin of a corresponding lower column to operatively electrically interconnect the ring output wire of the first network element and the ring input wire of the second network element;

a third electrical circuit for electrically interconnecting the third pin of an upper column with a first pin of a corresponding lower column to operatively electrically interconnect the tip input wire of the first network element and the tip output wire of the second network element;

a fourth electrical circuit for electrically interconnecting the fourth pin of an upper column with a second pin of a corresponding lower column to operatively electrically interconnect the ring input wire of the first network element and the ring output wire of the second network element;

said electrical circuits having electrical switch means responsive to insertion of a female access plug onto the one ends of a selected column of pins for interrupting the electrical circuits when the access plug is inserted (1) to discontinue electrical communication between the corresponding first and second network elements, and (2) to provide direct front signal access to one of the network elements.

2. The high density, low frequency telecommunication digital network interface patch panel as defined in claim 1 wherein the module body includes a printed circuit board having a front side and a rear side and wherein the wire-wrap pins extend though the printed circuit board with the one ends extending outward from the front side of the printed circuit board and the opposite ends extending outward from the rear side of the printed circuit board, and wherein the electrical circuits are mounted on the printed circuit board.

3. The high density, low frequency telecommunication digital network interface patch panel as defined in claim 2 wherein the electrical circuits have a first set of electrical printed circuit board conductors extending from respective upper column pins to corresponding upper column stationary switch contacts at a central location spaced from the upper column pins.

4. The high density, low frequency telecommunication digital network interface patch panel as defined in claim 3 wherein the electrical circuits have a second set of electrical printed circuit board conductors extending from respective lower column pins to corresponding lower column stationary switch contacts at the central location spaced from the lower column pins.

5. The high density, low frequency telecommunication digital network interface patch panel as defined in claim 4 wherein the switch means includes movable spring contact elements extending between corresponding upper column stationary switch contacts and lower column stationary switch contacts to electrically interconnect the respective upper column pins and the respective lower column pins to electrically interconnect the first and second network elements.

6. The high density, low frequency telecommunication digital network interface patch panel as defined in claim 5 wherein the movable spring contact elements are supported on the printed circuit board by a central support and wherein each movable spring contact element includes a first switch spring contact arm that extends from the central support to normally contact a respective upper column stationary switch contact and a second switch spring contact arm that extends from the central support to normally contact a respective lower column stationary switch contact.

7. The high density, low frequency telecommunication digital network interface patch panel as defined in claim 6 wherein the printed circuit board has a first access aperture formed therein associated with the first switch spring contact arm for providing switch actuation access to a first switch spring contact and a second access aperture formed therein associated with a second switch contact arm for providing switch actuation access to the second switch spring contact arm.

8. The high density, low frequency telecommunication digital network interface patch panel as defined in claim 2 wherein the module body includes a front face member and a rear face member sandwiching the printed circuit board therebetween and wherein each of the face members have apertures formed therethrough for receiving ends of the pins extending outward from the printed circuit board.

9. The high density, low frequency telecommunication digital network interface patch panel as defined in claim 8 wherein the front face member of the module body has access plug guide projections extending outward along side the one ends of the wire-wrap pins for receiving and facilitating the insertion of the female access plug onto the one end of a column of wire-wrap pins.

10. The high density, low frequency telecommunication digital network interface patch panel as defined in claim 9 wherein the female access plug has edge guides and wherein the guide projections have grooves formed therein aligned with the columns of wire-wrap pins for receiving the edge guides of the female access plug to align the plug with a selected column of pins and to facilitate the insertion of the plug onto the selected column of pins and to minimize accidental bending of the one end of the selected column pins.

11. The high density, low frequency telecommunication digital network interface patch panel as defined in claim 2 wherein the guide projections have releasable latching means associated with the female access plug to latch the plug to the panel when the plug is fully inserted over the one ends of a column of pins.

12. The high density, low frequency telecommunication digital network interface patch panel as defined in claim 11 wherein the releasable latching means includes an indentation formed in the edge guide of the access plug and a spring detent mounted in the projection grooves for releasably mating to secure the access plug on the selected column pins.

13. The high density, low frequency telecommunication digital network interface patch panel as defined in claim 1 wherein each column of pins are spaced approximately one-quarter inch from adjacent column of pins.

14. The high density, low frequency telecommunication digital network interface patch panel as defined in claim 1 wherein the panel has one-hundred-sixty-eight columns of four pins to service one-hundred sixty-eight network elements.

15. The high density, low frequency telecommunication digital network interface patch panel as defined in claim 1 wherein each module comprises four upper columns and four lower columns.

16. The high density, low frequency telecommunication digital network interface patch panel as defined in claim 1 wherein the female access plug has four female cavities for receiving the one ends of the selected column pins as the access plug is inserted over the selected column of pins to initially make electrical contact with the selected column of pins and wherein the female access plug has a switch actuating means and wherein the switching means has movable switch contacts associated with corresponding electrical circuits that are movable from a normally circuit closed condition to a circuit open condition and wherein the movable switch contacts are responsive to the switch actuating means of the female access plug to discontinue electrical communication between corresponding first and second network elements when the access plug is inserted onto the selected column pins.

17. The high density, low frequency telecommunication digital network interface patch panel as defined in claim 16 wherein the model has plug latching means for releasably securing the female patch plug on the one end of a selected column of pins when the female patch plug is fully inserted onto the one end.

18. A high density, low frequency telecommunication digital network interface patch panel assembly for terminating a plurality of four-wire low frequency telecommunication network elements and for enabling direct front electrical patch access to signals from such network elements, in which each of the four-wire telecommunication network elements includes a tip signal output wire, a ring signal output wire, a tip signal input wire, and a ring signal input wire, comprising:

a panel housing for normally mounting horizontally between uprights of a panel support;
  one or more pin modules mounted in the panel housing, each module having a module body with a front access face and a rear termination face;
  said module having an upper set of elongated wire-wrap pins extending through the module body with one end of each wire-wrap pin extending outward from the front access face and an opposite end extending outward from the rear termination face;
  said upper set of wire-wrap pins being arranged in adjacent columns of four wire-wrap pins each, with each column of four wire-wrap pins being associated with a first four-wire network element;
  said module having a lower set of elongated wire-wrap pins extending through the module body below the upper set, with one end of each lower set of wire-wrap pins extending outward from the front access face and an opposite end of each lower set of wire-wrap pins extending outward from the rear face;
  said lower set of wire-wrap pins being arranged in adjacent lower columns of four wire-wrap pins each, with each lower column of four wire-wrap pins being associated (1) with a corresponding upper column of four wire-wrap pins, and (2) with a second four-wire telecommunication network element;
  wherein one of the four wire-wrap pins in each pin column defines a tip signal output pin, with its opposite end adapted to interconnect with the tip signal output wire of one of the network elements;
  wherein a second of the four wire-wrap pins in each pin column defines a ring signal output pin, with its opposite end adapted to interconnect with the ring signal output wire of one of the network elements;
  wherein a third of the four wire-wrap pins in each pin column defines a tip signal input pin, with its opposite end adapted to interconnect with the tip signal input wire of one of the network elements;
  wherein a fourth of the four wire-wrap pins in each pin column defines a ring signal input pin, with its opposite end adapted to interconnect with the tip signal input wire of one of the network elements;
  a female patch access plug having four female pin cavities for inserting over the one ends of a selected column of four wire-wrap pins at the front face to provide front patch access to a corresponding network element of the selected column;
  a first electrical circuit for electrically interconnecting the first pin of an upper column with a third pin of a corresponding lower column to operatively electrically interconnect the tip output wire of the first network element and the tip input wire of the second network element;
  a second electrical circuit for electrically interconnecting the second pin of an upper column with a fourth pin of a corresponding lower column to operatively electrically interconnect the ring output wire of the first network element and the ring input wire of the second network element;
  a third electrical circuit for electrically interconnecting the third pin of an upper column with a first pin of a corresponding lower column to operatively electrically interconnect the tip input wire of the first network element and the tip output wire of the second network element;
  a fourth electrical circuit for electrically interconnecting the fourth pin of an upper column with a second pin of a corresponding lower column to operatively electrically interconnect the ring input wire of the first network element and the ring output wire of the second network element;
  said electrical circuits having switch means responsive to insertion of the female patch access plug onto the one ends of the selected column of pins for interrupting the electrical circuits when the access plug is inserted (1) to discontinue electrical communication between the corresponding first and second network elements, and (2) to provide direct front signal access to the one of the network elements.

19. The high density, low frequency telecommunication digital network interface patch panel assembly as defined in claim 18 wherein the module body includes a printed circuit board having a front side and a rear side and wherein the wire-wrap pins extend though the printed circuit board with the one ends extending outward from the front side of the printed circuit board and the opposite ends extending outward from the rear side of the printed circuit board, and wherein the electrical circuits are mounted on the printed circuit board.

20. The high density, low frequency telecommunication digital network interface patch panel assembly as defined in claim 19 wherein the electrical circuits have a first set of electrical printed circuit board conductors extending from respective upper column pins to corresponding upper column stationary switch contacts at a central location spaced from the upper column pins.

21. The high density, low frequency telecommunication digital network interface patch panel assembly as defined in claim 20 wherein the electrical circuits have a second set of electrical printed circuit board conductors extending from respective lower column pins to corresponding lower column stationary switch contacts at the central location spaced from the lower column pins.

22. The high density, low frequency telecommunication digital network interface patch panel assembly as defined in claim 18 wherein the switch means includes movable spring contact elements extending between corresponding upper column stationary switch contacts and lower column stationary switch contacts to electrically interconnect the respective upper column pins and the respective lower column pins to electrically interconnect the first and second network elements.

23. The high density, low frequency telecommunication digital network interface patch panel assembly as defined in claim 22 wherein the movable spring contact elements are supported on the printed circuit board by a central support and wherein each movable spring contact element includes a first switch spring contact arm that extends from the central support to normal contact with a respective upper column stationary switch contact and a second switch spring contact arm that extends from the central support to a respective lower column stationary switch contact.

24. The high density, low frequency telecommunication digital network interface patch panel assembly as defined in claim 23 wherein the printed circuit board has a first access aperture formed therein associated with a first switch spring contact arm for providing switch actuation access to the first switch spring contact arm and a second access aperture formed therein associated with a second switch spring contact arm for providing switch actuation access to the second switch spring contact arm.

25. The high density, low frequency telecommunication digital network interface patch panel assembly as defined in claim 24 wherein the female patch access plug has a switch actuation member for extending through the printed circuit access apertures to engage four switch contact arms to interrupt the electrical circuits when the access plug is inserted to discontinue electrical communication between the corresponding first and second network element.

26. The high density, low frequency telecommunication digital network interface patch panel assembly as defined in claim 18 wherein the female patch access plug has a switch actuation member and wherein the switch means is responsive to the switch actuation member when the plug is inserted onto the selected column of pins to interrupt the electrical circuits to discontinue electrical communication between the corresponding first and second network elements.

27. The high density, low frequency telecommunication digital network interface patch panel assembly as defined in claim 19 wherein the module body includes a front face member and a rear face member sandwiching the printed circuit board therebetween and wherein each of the face members have apertures formed therethrough receiving ends of the pins extending outward from the printed circuit board.

28. The high density, low frequency telecommunication digital network interface patch panel assembly as defined in claim 20 wherein the front face member of the module body has access plug guide projections extending outward along side the one ends of the wire-wrap pins for receiving and facilitating the insertion of the female access plug onto the one end of a column of wire-wrap pins.

29. The high density, low frequency telecommunication digital network interface patch panel assembly as defined in claim 28 wherein the female access plug has edge guides and wherein the guide projections have grooves formed therein aligned with the columns of wire-wrap pins for receiving the edge guides of the female access plug to align the plug with a selected column of pins and to facilitate the insertion of the plug onto the selected column of pins and to minimize accidental bending of the one end of the selected column pins.

30. The high density, low frequency telecommunication digital network interface patch panel assembly as defined in claim 29 wherein the female patch access plug has switch actuation member for actuating the electrical circuit switch means to interrupt the electrical circuits when the female patch access plug is inserted onto the one ends of the selected column of pins.

31. The high density, low frequency telecommunication digital network interface patch panel assembly as defined in claim 29 wherein the guide projections have releasable latching means associated with the female access plug to latch the plug to the panel when the plug is fully inserted over the one ends of a column of pins.

32. The high density, low frequency telecommunication digital network interface patch panel assembly as defined in claim 31 wherein the releasable latching means includes in indentation formed in the edge guide of the access plug and a spring detent mounted in the projection grooves for releasably mating to secure the access plug on the selected column pins.

33. The high density, low frequency telecommunication digital network interface patch panel assembly as defined in claim 18 wherein each column of pins are spaced approximately one-quarter inch from adjacent column of pins.

34. The high density, low frequency telecommunication digital network interface patch panel assembly as defined in claim 18 wherein the panel has one-hundred-sixty-eight columns of four pins to service one-hundred sixty-eight network elements.

35. The high density, low frequency telecommunication digital network interface patch panel assembly as defined in claim 18 wherein each module comprises four upper columns and four lower columns.

36. The high density, low frequency telecommunication digital network interface patch panel assembly as defined in claim 18 wherein the female access plug has a switch actuating means and wherein the switching means has movable switch contacts associated with corresponding electrical circuits that are movable from a normal circuit closed condition to a circuit open condition and wherein the movable switch contacts are responsive to the switch actuating means of the female access plug to discontinue electrical communication between corresponding first and second network elements when the access plug is inserted onto the selected column pins.

37. The high density, low frequency telecommunication digital network interface patch panel assembly as defined in claim 18 wherein the female access plug and the switch means are designed so that the plug makes electrical contact with the one ends when the plug is initially inserted onto the one ends to initially provide direct front signal access to one of the network elements and then to interrupt the electrical circuits as the plug is fully inserted onto the one ends to discontinue electrical communication between the corresponding first and second network elements to provide a make-before-break switching arrangement.

38. A high density, low frequency telecommunication digital network interface patch panel for terminating a plurality of four-wire low frequency telecommunication network elements and for enabling direct front electrical patch access to signals from such network elements, in which each of the four-wire telecommunication network elements includes a tip signal output wire, a ring signal output wire, a tip signal input wire, and a ring signal input wire, comprising:

a panel housing for normally mounting horizontally between uprights of a panel support;

one or more pin modules mounted in the panel housing, each module having a module body with a front access face and a rear termination face;

said module having an upper set of elongated wire-wrap pins extending through the module body with one end of each wire-wrap pin extending outward from the front access face and an opposite end extending outward from the rear termination face;

said upper set of wire-wrap pins being arranged in adjacent columns of four wire-wrap pins each, with each column of four wire-wrap pins being associated with a first four-wire network element;

said module having a lower set of elongated wire-wrap pins extending through the module body below the upper set, with one end of each lower set of wire-wrap pins extending outward from the front access face and an opposite end of each lower set of wire-wrap pins extending outward from the rear face;

said lower set of wire-wrap pins being arranged in adjacent lower columns of four wire-wrap pins each, with each lower column of four wire-wrap pins being associated (1) with a corresponding upper column of four wire-wrap pins, and (2) with a second four-wire telecommunication network element;

wherein one of the four wire-wrap pins in each pin column defines a tip signal output pin, with its opposite end adapted to interconnect with the tip signal output wire of one of the network elements;

wherein a second of the four wire-wrap pins in each pin column defines a ring signal output pin, with its opposite end adapted to interconnect with the ring signal output wire of one of the network elements;

wherein a third of the four wire-wrap pins in each pin column defines a tip signal input pin, with its opposite end adapted to interconnect with the tip signal input wire of one of the network elements;

wherein a fourth of the four wire-wrap pins in each pin column defines a ring signal input pin, with its opposite end adapted to interconnect with the tip signal input wire of one of the network elements;

wherein the module includes an upper front monitor bantam jack and a lower front monitor bantam jack;

a first electrical circuit for electrically interconnecting the first pin of an upper column with a third pin of a corresponding lower column to operatively electrically interconnect the tip output wire of the first network element and the tip input wire of the second network element;

a second electrical circuit for electrically interconnecting the second pin of an upper column with a fourth pin of a corresponding lower column to operatively electrically interconnect the ring output wire of the first network element and the ring input wire of the second network element;

a third electrical circuit for electrically interconnecting the third pin of an upper column with a first pin of a corresponding lower column to operatively electrically interconnect the tip input wire of the first network element and the tip output wire of the second network element;

a fourth electrical circuit for electrically interconnecting the fourth pin of an upper column with a second pin of a corresponding lower column to operatively electrically interconnect the ring input wire of the first network element and the ring output wire of the second network element;

a fifth electrical circuit for electrically interconnecting the first and second pins of the upper column with the upper monitor jack;

a sixth electrical circuit for electrically interconnecting the first and second pins of the lower column with the lower monitor jack;

said electrical circuits having switch means responsive to insertion of a female access plug onto the one ends of a selected column of pins for interrupting the electrical circuits when the access plug is inserted (1) to discontinue electrical communication between the corresponding first and second network elements, and (2) to provide direct front signal access to one of the network elements.

39. The high density, low frequency telecommunication digital network interface patch panel as defined in claim 38 wherein the module body includes a printed circuit board having a front side and a rear side and wherein the wire-wrap pins extend though the printed circuit board with the one ends extending outward from the front side of the printed circuit board and the opposite ends extending outward from the rear side of the printed circuit board, and wherein the electrical circuits are mounted on the printed circuit board.

40. The high density, low frequency telecommunication digital network interface patch panel as defined in claim 39 wherein the electrical circuits have a first set of electrical printed circuit board conductors extending from respective upper column pins to corresponding upper column stationary switch contacts at a central location spaced from the upper column pins.

41. The high density, low frequency telecommunication digital network interface patch panel as defined in claim 40 wherein the electrical circuits have a second set of electrical printed circuit board conductors extending from respective lower column pins to corresponding lower column stationary switch contacts at the central location spaced from the lower column pins.

42. The high density, low frequency telecommunication digital network interface patch panel as defined in claim 41 wherein the switch means includes movable spring contact elements extending between corresponding upper column stationary switch contacts and lower column stationary switch contacts to electrically interconnect the respective upper column pins and the respective lower column pins to electrically interconnect the first and second network elements.

43. The high density, low frequency telecommunication digital network interface patch panel as defined in claim 42 wherein the movable spring contact elements are supported on the printed circuit board by a central support and wherein each movable spring contact element includes a first switch spring contact arm that extends from the central support to a respective upper column stationary switch contact and a second switch spring contact arm that extends from the central support to a respective lower column stationary switch contact.

44. The high density, low frequency telecommunication digital network interface patch panel as defined in claim 43 wherein the printed circuit board has first access aperture formed therein associated with the first switch spring contact arm for providing switch actuation access to the first switch spring contact and a second access aperture formed therein associated with the second switch contact arm for providing switch actuation access to the second switch spring contact arm.

45. The high density, low frequency telecommunication digital network interface patch panel as defined in claim 40 wherein the module body includes a front face member and a rear face member sandwiching the printed circuit board therebetween and wherein each of the face members have apertures formed therethrough receiving ends of the pins extending outward from the printed circuit board.

46. The high density, low frequency telecommunication digital network interface patch panel as defined in claim 45 wherein the front face member of the module body has access plug guide projections extending outward along side the one ends of the wire-wrap pins for receiving and facilitating the insertion of the female access plug onto the one end of a column of wire-wrap pins.

47. The high density, low frequency telecommunication digital network interface patch panel as defined in claim 46 wherein the access plug projections house the monitor bantam jacks enabling user to insert bantam plugs into the bantam jacks along side the insertion of the female access plug.

48. The high density, low frequency telecommunication digital network interface patch panel as defined in claim 46 wherein the female access plug has edge guides and wherein the guide projections have grooves formed therein aligned with the columns of wire-wrap pins for receiving the edge guides of the female access plug to align the plug with a selected column of pins and to facilitate the insertion of the plug onto the selected column of pins and to minimize accidental bending of the one end of the selected column pins.

49. The high density, low frequency telecommunication digital network interface patch panel as defined in claim 48 wherein the guide projections have releasable latching means associated with the female access plug to latch the plug to the panel when the plug is fully inserted over the one ends of a column of pins.

50. The high density, low frequency telecommunication digital network interface patch panel as defined in claim 49 wherein the releasable latching means includes in indentation formed in the edge guide of the access plug and a spring detent mounted in the projection grooves for releasably mating to secure the access plug on the selected column pins.

51. The high density, low frequency telecommunication digital network interface patch panel as defined in claim 38 wherein each column of pins are spaced approximately one-quarter inch from adjacent column of pins.

52. The high density, low frequency telecommunication digital network interface patch panel as defined in claim 38 wherein the panel has one-hundred-sixty-eight columns of four pins to service one-hundred sixty-eight network elements.

53. The high density, low frequency telecommunication digital network interface patch panel as defined in claim 38 wherein each module comprises four upper columns and four lower columns.

54. The high density, low frequency telecommunication digital network interface patch panel as defined in claim 38 wherein the female access plug has four female cavities for receiving the one ends of the selected column pins as the access plug is inserted over the selected column of pins to initially make electrical contact with the selected column of pins and wherein the female access plug has a switch actuating means and wherein the switching means has movable switch contacts associated with corresponding electrical circuits that are movable from a normally circuit closed condition to a circuit open condition and wherein the movable switch contacts are responsive to the switch actuating means of the female access plug to discontinue electrical communication between corresponding first and second network elements when the access plug is inserted onto the selected column pins.

55. The high density, low frequency telecommunication digital network interface patch panel as defined in claim 54 wherein the movable switch contacts are electrically conductive leaf springs.

* * * * *